US007649298B2

(12) United States Patent
Enomoto et al.

(10) Patent No.: US 7,649,298 B2
(45) Date of Patent: Jan. 19, 2010

(54) CLAW TEETH TYPE ELECTRIC ROTARY MACHINE AND MANUFACTURING METHOD FOR STATORS

(75) Inventors: Yuji Enomoto, Hitachi (JP); Motoya Ito, Hitachinaka (JP); Masashi Kitamura, Mito (JP); Ryoso Masaki, Hitachi (JP); Katsuyuki Yamazaki, Chiba (JP); Shoji Ohiwa, Saitama (JP); Yasuaki Motegi, Gunma (JP); Kazuo Asaka, Matsudo (JP); Chio Ishihara, Tokyo (JP)

(73) Assignees: Hitachi Industrial Equipment Systems Co., Ltd., Tokyo (JP); Hitachi Powered Metals Co., Ltd., Chiba (JP); Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 11/782,077

(22) Filed: Jul. 24, 2007

(65) Prior Publication Data

US 2008/0018196 A1 Jan. 24, 2008

(30) Foreign Application Priority Data

Jul. 24, 2006 (JP) ............................ 2006-200211

(51) Int. Cl.
*H02K 1/04* (2006.01)
*H02K 1/12* (2006.01)
*H02K 15/00* (2006.01)

(52) U.S. Cl. ........................................ 310/257; 310/43

(58) Field of Classification Search ............. 310/43–45, 310/49 R, 257

See application file for complete search history.

(56) References Cited

U.S. PATENT DOCUMENTS

| | | | | |
|---|---|---|---|---|
| 5,280,206 | A * | 1/1994 | Ando et al. | 310/42 |
| 5,598,046 | A | 1/1997 | Miyazawa et al. | |
| 6,153,953 | A * | 11/2000 | Isozaki et al. | 310/49 R |
| 2005/0057114 | A1* | 3/2005 | Calico | 310/257 |
| 2005/0082919 | A1* | 4/2005 | Neal et al. | 310/43 |

FOREIGN PATENT DOCUMENTS

| | | |
|---|---|---|
| JP | 07-227075 | 8/1995 |
| JP | 2002-359938 | 12/2002 |

OTHER PUBLICATIONS

Office Action in Chinese Patent Appln. 2007-10146493.X (6 pages); partial English language translation (3 pages); issued Oct. 23, 2009.

* cited by examiner

*Primary Examiner*—Tran N Nguyen
(74) *Attorney, Agent, or Firm*—Antonelli, Terry, Stout & Kraus, LLP.

(57) ABSTRACT

A claw teeth type electric rotary machine comprises a stator including an annular core with claws formed from a powder core and an annular coil installed inside the annular core, and a rotor rotatably positioned inside the stator. An inner edge of the annular core is provided with plural claw poles which are protruded at a predetermined interval in a circumferential direction and extended in an axial direction of the annular core so as to alternately meshes with each other. The stator comprises the annular core with claws, the annular coil, and a molded nonmagnetic potting material filled between the annular core with claws and annular coil, so that the annular core with claws and annular coil are integrated with the molded potting non-magnetic material.

13 Claims, 9 Drawing Sheets

21 24 7 1 22

21 24 6 20

SECTION A

SECTION B

SECTION C

CLAW TEETH TYPE ELECTRIC ROTARY MACHINE AND MANUFACTURING METHOD FOR STATORS

CLAIM OF PRIORITY

The present application claims priority from Japanese application serial no. 2006-200211 filed on Jul. 24, 2006, the contents of which are hereby incorporated by reference into this application.

FIELD OF THE INVENTION

The present invention relates to a claw teeth type electric rotary machine in which an annular coil is provided inside an annular core with claws and a manufacturing method for stators.

BACKGROUND OF THE INVENTION

Motors are used as equipment for driving that coverts electrical energy into mechanical energy for industrial use in the field of household appliances, the field of automobiles, and the like. In JP-A-2002-359938 (FIG. 9), for example, there is disclosed a slot type three-phase brushless motor because of its inexpensive structure, the simplicity of its drive circuit, and the like. There are various types of motors, single-phase, two-phase, and three-phase, and different types are used depending on applications. Especially, three-phase motors are excellent in controllability and can be connected in Δ formation and in Y formation. Therefore, they have an advantage that they can be driven in normal and reverse rotations by a smaller number of transistor elements.

In JP-A-7-227075 (FIG. 2), there is disclosed a claw teeth type motor whose stator is constructed of an annular core provided with plural claw poles and an annular coil provided inside this annular core.

In the claw teeth type motor in JP-A-7-227075 (FIG. 2 ), the material of its stator core is formed of SPCC (cold-rolled steel plate: Japanese Industrial Standard) or the like. An annular coil is clamped between annular core portions and claw poles (claw poles) are formed on the inner circumferential area by bending.

However, this claw teeth type motor involves problems. The SPCC is inferior in magnetic characteristic and, in bent portions on which magnetic flux is concentrated, the magnetic characteristic is further degraded because of stress strain due to the production of residual stress. For this reason, a large iron loss is produced in the core of this motor. Since SPCC is bent, residual stress is produced in bent portions in the core and stress strain incurs further degradation in magnetic characteristic. Especially, since magnetic flux is concentrated on these bent portions, a large iron loss is produced there. That is, the claw teeth type motor using SPCC, disclosed in JP-A-7-227075 (FIG. 2), is very inefficient.

To avoid degradation in magnetic characteristic due to bending of a core, a powder core obtained by compacting insulatively coated iron powder can be used. However, stator cores using a powder core involve a problem of low mechanical strength. For example, a powder core compact are 10 MPa in bending strength, which is lower than that of iron plates and the like, and are also susceptible to impact. When a motor is constructed, consequently, it must be so structured that it can withstand torque reaction force produced between a stator and a rotor, external impact, disturbances, such as vibration, and the like.

Consequently, it is an object of the invention to provide a claw teeth type electric rotary machine in which the mechanical strength of a stator can be enhanced and a manufacturing method for stators.

SUMMARY OF THE INVENTION

To attain the above object, the invention is embodied as a claw teeth type electric rotary machine including a stator having an annular core with claws formed from a powder core and an annular coil installed inside the annular core, and a rotor rotatably positioned inside the stator. Therein, an inner edge of the annular core is provided with plural claw poles which are protruded at a predetermined interval in a circumferential direction and extended in an axial direction of the annular core so as to alternately meshes with each other; and the stator comprises the annular core with claws, the annular coil, and a molded nonmagnetic potting material filled between the annular core with claws and annular coil, so that the annular core with claws and annular coil are integrated with the molded potting material. Since the stator core and stator coil are integrated with molded material as the potting material, a gap between the annular coil and the annular core with claws is eliminated. This avoids compressive deformation and enhances the mechanical strength of the stator. Further, since the annular core with claws is formed of a powder core, a core loss can be reduced.

According to the invention, it is possible to provide a claw teeth type electric rotary machine and a manufacturing method for stators wherein the mechanical strength of a stator can be enhanced.

DETAILED DESCRIPTION OF THE PREFERRED EMBODIMENTS

First Embodiment

Description will be given to the structure of a claw teeth type motor (claw teeth type electric rotary machine) in an embodiment of the invention with reference to drawings.

Figure 1:
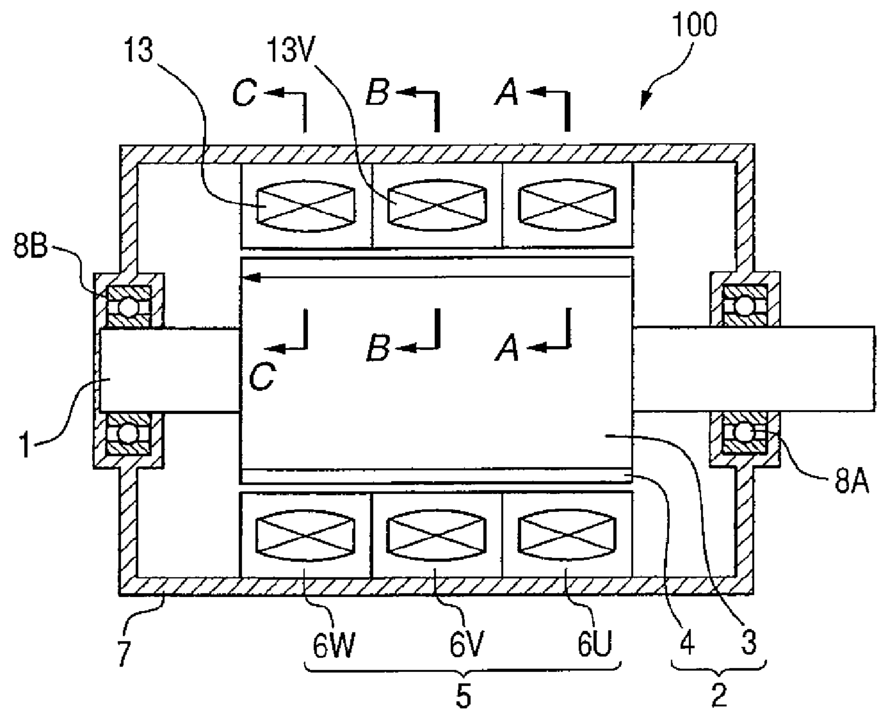
FIG. 1 is a sectional view of a claw teeth type motor in an embodiment of the invention.

The claw teeth type motor 100 illustrated in the vertical sectional view in FIG. 1 is a polyphase motor of 16 poles and three phases. It includes: plural annular stators 5 provided in a housing (end bracket) 7; a rotor 2 with a shaft 1 positioned inside the annular stators wherein the shaft 1 is inserted into the rotor 2 in the annular stators; and bearings 8A, 8B which are fixed in the housing 7 and rotatably (revolvably) hold the shaft 1.

The rotor 2 has so-called ring magnet structure and is formed by magnetizing a ring-shaped ferromagnetic body in 16 poles to obtain a rotor core 3 and inserting (fixing) the shaft 1 into this rotor core by adhesive bonding or the like. The rotor 2 has its both axial ends rotatably supported by the bearings 8A, 8B in the housing 7. The stators 5 are fixed in the housing 7 and their inner surfaces faces to an outer surface of the rotor 2 with an air gap in-between. The stators 5 of the claw teeth type motor 100 are so structured that each stator equivalent to one phase separately exists. The stators 5 equivalent to three phases are disposed so that their unit A (u phase), unit B (v phase), and unit C (w phase) are arranged in the axial direction in order to construct a three-phase motor.

Figure 2:
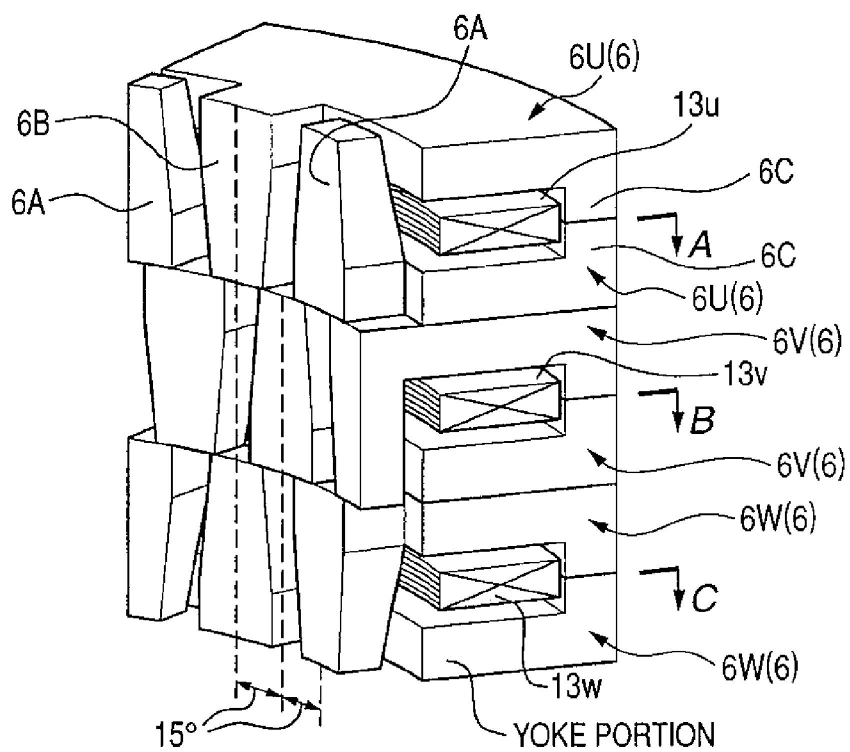
FIG. 2 is a perspective view illustrating stator cores equivalent to three phases.

FIG. 2 is a perspective view of one pole pair of the stators 5 equivalent to three phases disposed in an alignment. The stator 5 in each phase includes a pair of claw teeth cores 6 as a stator core and a coil 13 (13*u*, 13*v*, 13*w*). As described later, an area between the stator core (a pair of claw teeth cores) 6 and the coils 13 is molded with a potting material of nonmagnetic material. The two stator claw teeth cores 6 in each phase are respectively provided with claw poles 6A, 6B, and they are overlaid together so that these claw poles 6A, 6B are engaged with each other. A thermosetting or thermoplastic resin is used for the potting material.

The stators 5 are disposed in alignment in the direction of the axis of the shaft 1. The stator cores 6 (U phase: 6U, V phase: 6V, W phase: 6W) as members of the annular core with claws are disposed so that they differ from one another in position in the direction of rotation every 120 degrees of electrical angle. In the 16-pole motor in this embodiment, the stators 5 are mechanically shifted by 15 degrees at Units (U-phase, V-phase, W-phase) A, B, C because mechanical angle = electrical angle/number of pole pairs=120 degrees/8=15 degrees.

In the stator cores (6U, 6V, 6W), a magnetic flux three-dimensionally flows. Specifically, the claw poles 6A receive a magnetic flux from the rotor magnet 4 in the radial direction, and this magnetic flux flows in the axial direction. Further, it goes through a yoke portion (annular portion) and returns from the adjacent claw poles 6B to the rotor magnet 4 in the radial direction. Since the claw poles 6A, 6B have short trapezoidal tips, the magnetic flux density is made uniform and a number of poles can be increased.

Figure 3A:
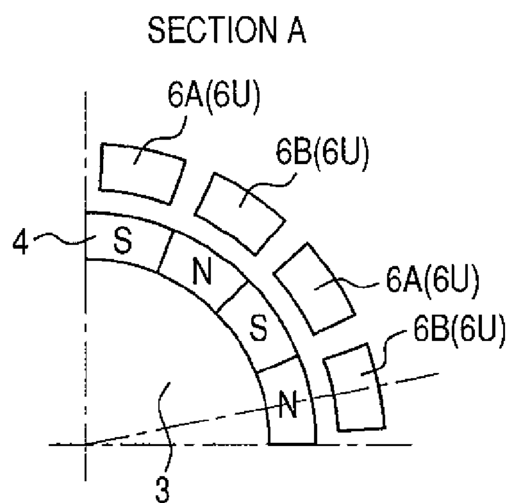
FIG. 3A is a sectional view of a stator core in the u phase.
Figure 3B:
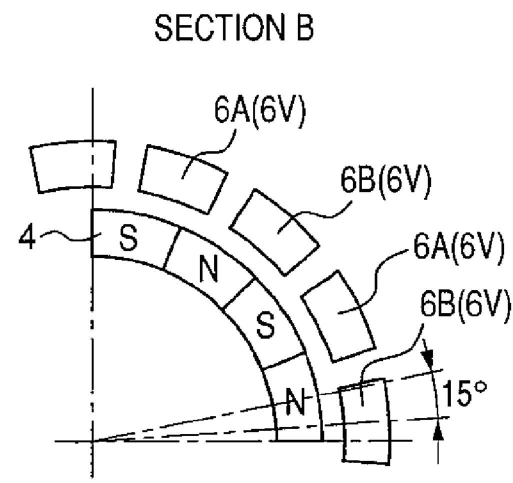
FIG. 3B is a sectional view of a stator core in the v phase.
Figure 3C:
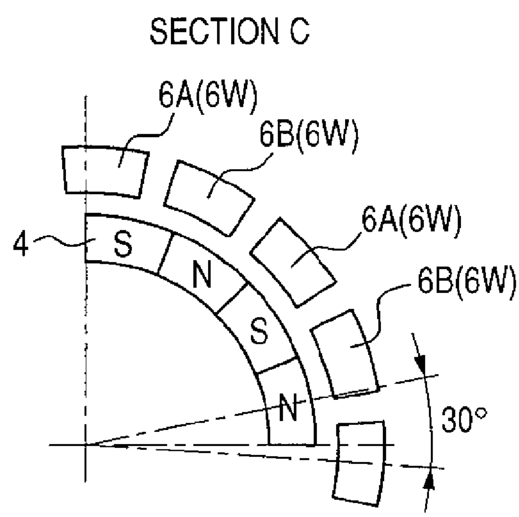
FIG. 3C is a sectional view of a stator core in the w phase.

FIGS. 3A to 3C are respectively sectional views taken at the sections A, B, and C of FIG. 1. The positions of the poles of the rotor magnet 4 are identical at the sections A, B, and C. At the section A, the centers of the claw poles 6A, 6B are aligned with the centers of the poles of the rotor magnet 4. At the section B, the positions of the claw poles are shifted by 15 degrees from those at the section A. At the section C, the positions of the claw poles 6A, 6B are shifted by 30 degrees from those at the section A.

Since a magnetic flux flows through yoke portions (annular portions) of the stator cores 6*u*, 6*v*, 6*w*, a problem arises as follows. When the stator cores 6*u*, 6*v*, 6*w* are constructed of a bulk of magnetic material such as iron, an eddy current is produced. If the stator cores 6*u*, 6*v*, 6*w* are formed by laminating thin plates like slot type motors, there is no such a problem. However, it is difficult to construct them by laminating thin plates like slot type motors. Therefore, it is desirable that they should be constructed of a powder core of a magnetic material that is an electrical insulator (or iron powder coated with insulating material). However, this powder core involves the above-mentioned problem of very low mechanical strength. (For example, its bending strength is 10 MPa or so, which is approximately ⅓ of that of iron plates.) Therefore, it cannot withstand torque reaction force produced between the rotor 2 and the stators 5 or the like.

Figure 4:
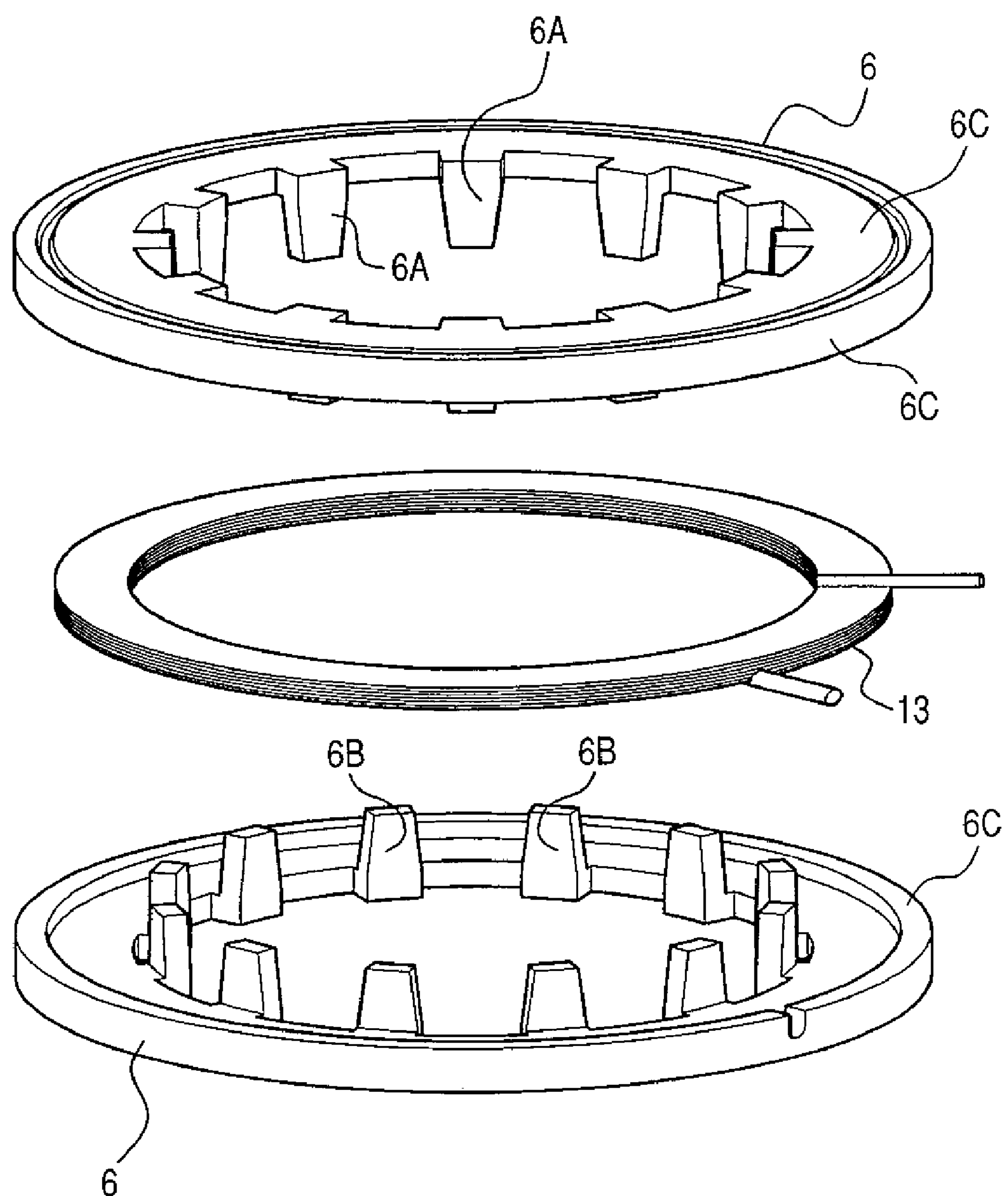
FIG. 4 is a perspective view illustrating the structure of a stator.
Figure 5:
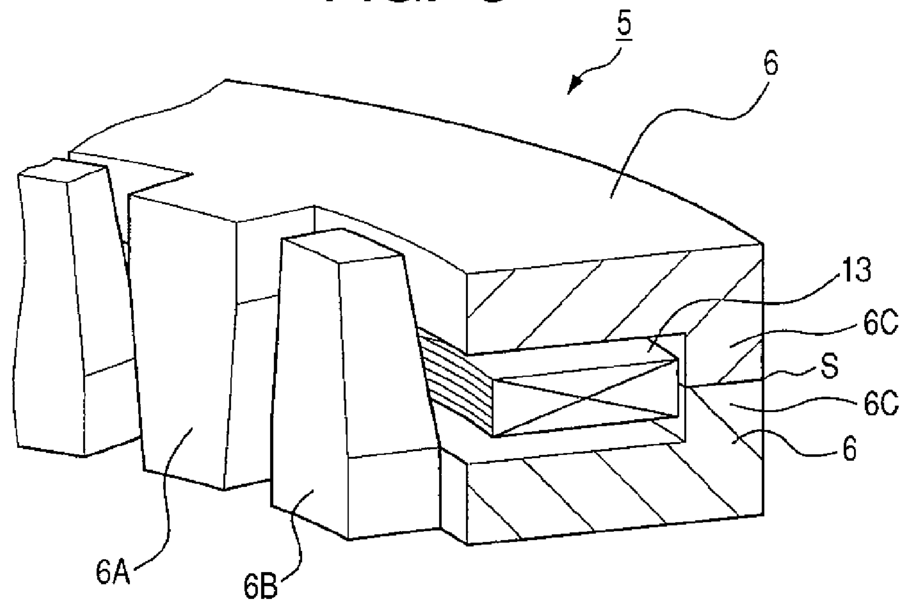
FIG. 5 is a perspective view for explaining the operation of a stator.

FIG. 4 is a perspective view illustrating the structure of stator core (a pair of claw teeth cores) 6. Stator core 6 equivalent to one phase include: annular yoke portions so formed that each of outer edges of them has an L-shape vertical-section rim 6C; and inner edges of the annular yoke portions are provided with plural claw poles 6A, 6B, which are protruded at equal intervals on the inner edges and extended in the axial direction so as to alternately meshes with each other. Furthermore, the stator cores are formed by compacting magnetic powder as is compressed in the axial direction. As illustrated in FIG. 5, the annular core with claws is configured that: two stator claw teeth cores 6 face to each other with respect to a plane S where rims are butt to each other; and the claw poles 6A, 6B with engaged to each other. The stator 5 includes: the annular core (a pair of claw teeth cores 6) with claws constructed by engaging claw poles 6A, 6B with each other; and a annular coil 13 installed in a hollow formed on the outer radius side of the claw poles 6A, 6B by combining the stator claw teeth cores 6 to each other. The stator is formed by a pair of claw teeth cores 6 as the annular stator core, the annular coil 13, and a molded potting compound (a molded potting material) 20 filled areas between the claw teeth cores 6 and annular coil 13 (refer to FIG. 7), and by integrating the claw teeth cores and coil 13 with the potting compound 20.

Figure 6:
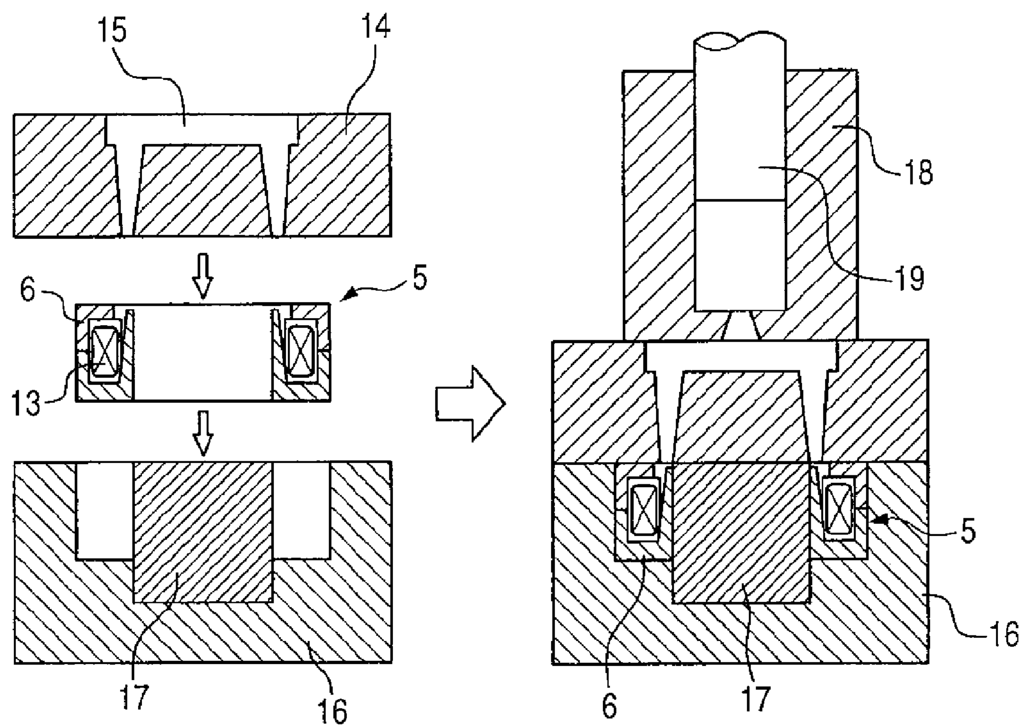
FIG. 6 is a structural drawing of a mold used in resin molding.
Figure 7:
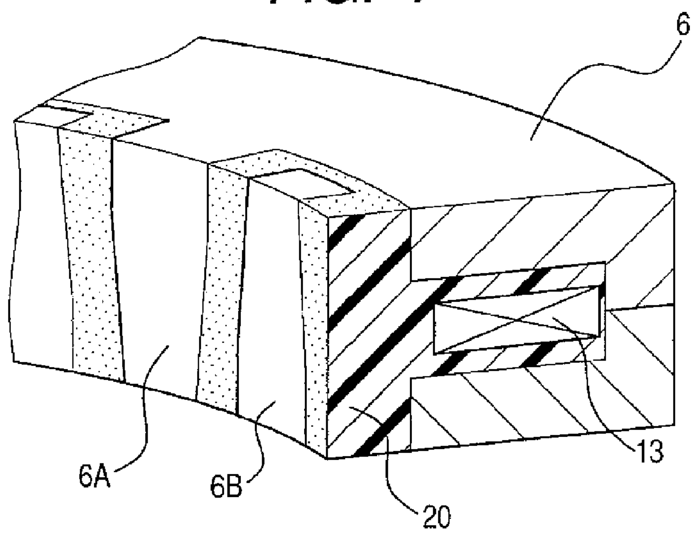
FIG. 7 is a perspective view of a molded stator.

FIG. 6 is a vertical sectional view of a mold for molding potting compound 20. The mold is used in injection molding, transfer molding, and the like. It includes: an upper die 14 provided with a gate 15 through which molding resin is injected; a lower die 16 coaxially provided with a cylindrical center core 17; a resin injection cylinder 18; and a resin injection plunger 19. A stator 5 is set in this mold, and thermoplastic, thermosetting, or other like molded resin is filled into the resin injection cylinder 18. Then, the resin injection plunger 19 is press fit, and the molding resin is thereby filled into the gap between the two stator claw teeth cores 6 faced to each other and the coil 13 through the gate 15. As illustrated in FIG. 7, the gap between the stator cores 6 and the coil 13 and the gaps between the claw poles 6A and the claw poles 6B are closely filled with the molded resin as potting compound 20. Therefore, the mechanical strength of the stator cores 6 can be enhanced. In this case, it is desirable that the coefficient of linear expansion of the molded resin 20 should be close to the coefficient of linear expansion of the stator core (claw teeth cores) 6.

According to this embodiment, as mentioned up to this point, the gap between the stator core 6 and the coil 13 is filled with the molded potting compound 20. Therefore, compressive deformation is reduced, and the mechanical strength of the stator 5 can be enhanced. Use of a powder core reduces an eddy current loss as compared with cases where SPCC plates are laminated. Since the claw poles are not formed by bending, a core loss at bent portions is not occurred. That is, this claw teeth type motor 100 makes it possible to simultaneously accomplish the enhancement of motor efficiency and the enhancement of mechanical strength.

Second Embodiment

In the claw teeth type motor 100 in the first embodiment, the three independent stators 5 are disposed in alignment in the axial direction. (Refer to FIG. 1.) Therefore, an imbalance may occurs among phases. More specific description will be given as follows. The stators in two phases (u phase and w phase) positioned at both ends are so structured that one axial ends of their inner surfaces faced to the rotor magnet 4 are positioned close to the ends of the rotor magnet. On the other hand, the stator in the center phase (v phase) is so structured that neither of the axial ends of its inner surface faced to the rotor magnet is positioned close to the ends of the rotor magnet. This structure may break down the balance in terms of magnetic circuit. This imbalance causes unbalanced induced electromotive force to the coils 13. As a result, the efficiency of the motor may be reduced, and further cogging torque due to magnetic imbalance and torque pulsation during load operation may occur. Cogging torque refers to change in torque relative to rotation angle, or so-called uneven torque, caused based on magnetic attraction between a stator 5 and a rotor 2.

A motor in this embodiment is intended to solve these problems associated with three-phase claw teeth type motors 100. The motor configuration is basically the same as illustrated in FIG. 1. The motor in this embodiment is different in that the rotor magnet 4 and the stators 5 are provided with magnetic insulation between their phases.

Figure 8A:
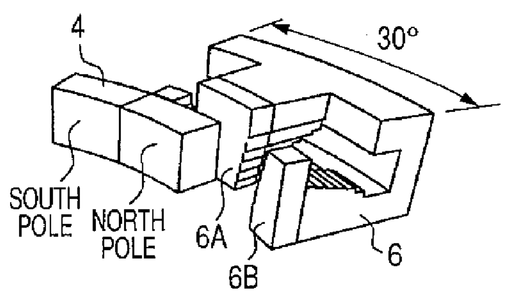
FIG. 8A illustrates a mesh model for FEM analysis on a claw teeth type motor.
Figure 8B:
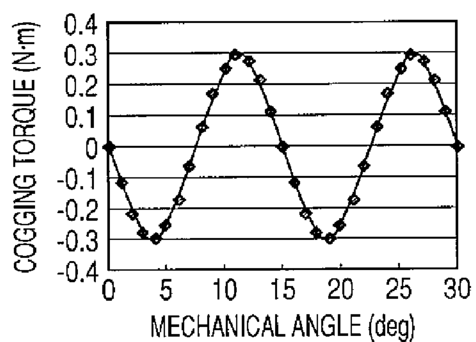
FIGS. 8B to 8D illustrate the results of cogging torque analyses.
Figure 8C:
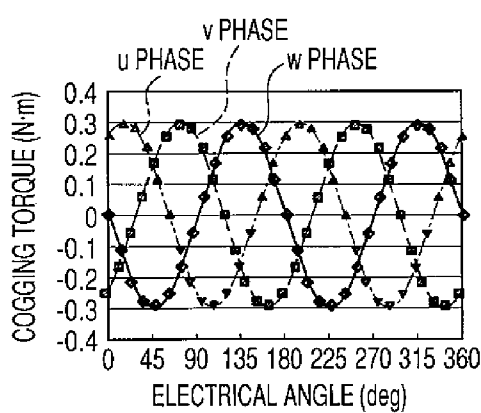

FIGS. 8A to 8D illustrate an example where the cogging torque of the claw teeth type motor 100 is computed using an FEM (electromagnetic field analysis). FIG. 8A illustrates an FEM mesh model of one cycle (mechanical angle=360 degrees/12 pole pairs=30 degrees) of electrical angle of a 24-pole claw teeth type motor 100. FIG. 8B illustrates the result obtained by computing the cogging torque [N.m] of the motor relative to mechanical angle with the magnetic characteristics of the rotor magnet 4 and the claw poles 6A, 6B taken as input conditions, using this FEM mesh model. The following can be seen from the drawing: when the rotor magnet 4 is rotated by 30 degrees from 0 degree, the air-gap flux density is varied depending on the relation between the rotor magnet 4 and the claw poles 6A, 6B and two cycles of sinusoidal torque are produced. When it is assumed that cogging torque similar with this cogging torque produced in one phase is also produced in any other phase, the following takes place: while the position of the rotor magnet 4 is identical in the axial direction, as illustrated in FIG. 1, the positions of the claw poles 6A, 6B of the stators 5 are shifted by 120 degrees of electrical angle; therefore, cogging torques produced in the v phase and the w phase are those obtained when the cycle of the cogging torque in FIG. 8B is shifted by 120 degrees of electrical angle. FIG. 8C illustrates cogging torque in the individual phases. The waveform (amplitude, period) of these cogging torques is the same as in FIG. 8B, and only their phases are shifted by 120 degrees.

Figure 8D:
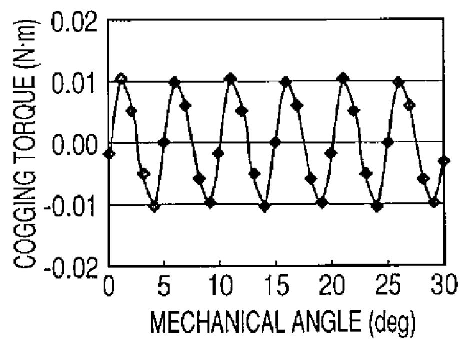

When viewed from the standpoint of a three-phase motor, these cogging torques are a combined torque equivalent to three phases. FIG. 8D illustrates the waveform of this combined torque. FIG. 8D is different from FIGS. 8B and 8C in the scale of the vertical axis. The following can be implemented by combining torques equivalent to three phases: the cogging torque viewed from the standpoint of a motor can be reduced to a very small cogging torque. Its amplitude is 1/30 of the amplitude of a cogging torque equivalent to one phase and it has six cycles for one cycle of electrical angle. This is implemented when stators and a rotor equivalent to individual phases independently exist and they are not influenced by other phases. This motor structure corresponds to the case illustrated in FIG. 9A. That is, the stator cores 6 equivalent to one phase are magnetically insulated by a magnetic insulation material (magnetic insulation plate) 21 formed of nonmagnetic material. At the same time, the rotor magnet (permanent magnet) 4 of the rotor 2 is divided by gaps between magnets 23 in the axial direction.

Figure 9A:
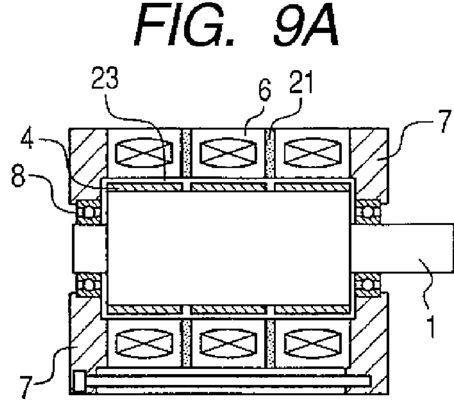
FIG. 9A is a sectional view illustrating a motor provided with a magnetic insulation material and a gap between magnets.
Figure 9B:
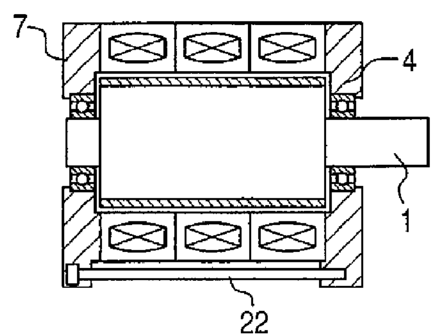
FIG. 9B is a sectional view illustrating a motor not provided with a magnetic insulation material or a gap between magnets.
Figure 9C:
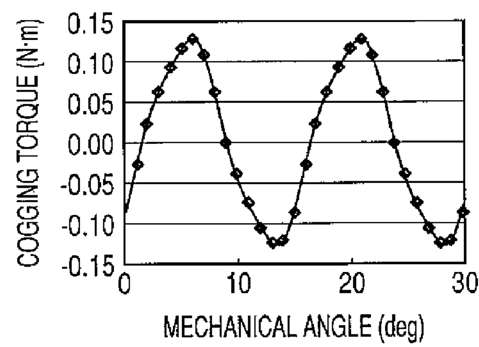
FIG. 9C is a drawing illustrating cogging torque.

On the other hand, when the magnetic insulation (magnetic insulation material 21, gap between magnets 23) is not provided as illustrated in FIG. 9B, the following takes place: one phase (central phase) is magnetically different; therefore, in combined torque equivalent to three phases, two cycles of cogging torque are produced for one cycle of electrical angle due to unbalanced magnetic energy, as illustrated in FIG. 9C. Therefore, the magnetic insulation material 21 and gap between magnets 23 of nonmagnetic material, illustrated in FIG. 9A, are indispensable to applications requiring reduced cogging torque, for example, precision equipment applications.

Figure 10A:
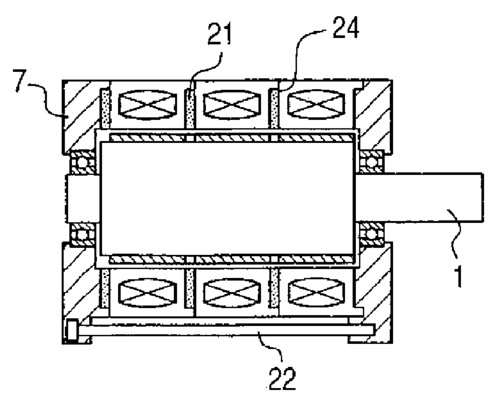
FIG. 10A is a structural drawing illustrating a motor provided with a socket and spigot joint section for positioning, formed by integral molding.
Figure 10B:
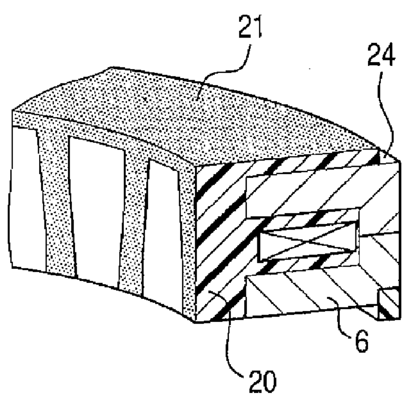
FIG. 10B is a perspective view of a stator.

This magnetic insulation material 21 is usually formed of organic material, such as plastics, or nonmagnetic metal material, such as copper, stainless steel, and aluminum. It is required to maintain coaxiality between stator claw teeth cores (annular core with claws) in adjoining phases and to have exact dimensions, for example, parallelism in the axial direction. In the stator claw teeth cores (annular core with claws) of the molding structure described in relation to the first embodiment, the following can be implemented only by exercising ingenuity in designing the shape of a mold: the magnetic insulation material can be constructed by integrating with molded material. FIGS. 10A and 10B illustrate a structure for this purpose. A magnetic insulation material 21 (nonmagnetic portion) for magnetic insulation is integrated with molded resin, and a portion functioning for ensuring coaxiality, such as a socket and spigot joint section 24, is formed in this resin portion. A recess is formed in an end face of a core, formed of a powder core, on one side and a resin projection is formed on one end face molded with resin in the axial direction. Then, these cores are assembled in the axial direction. Thus, such a structure that concentricity, coaxiality, and parallelism are uniquely achieved is obtained.

According to this embodiment, as mentioned up to this point, cogging torque is reduced by providing the magnetic insulation material 21 using organic material or nonmagnetic metal material between phases. It is desirable to achieve coaxiality using the socket and spigot joint section 24 at this time.

Third Embodiment

Figure 11A:
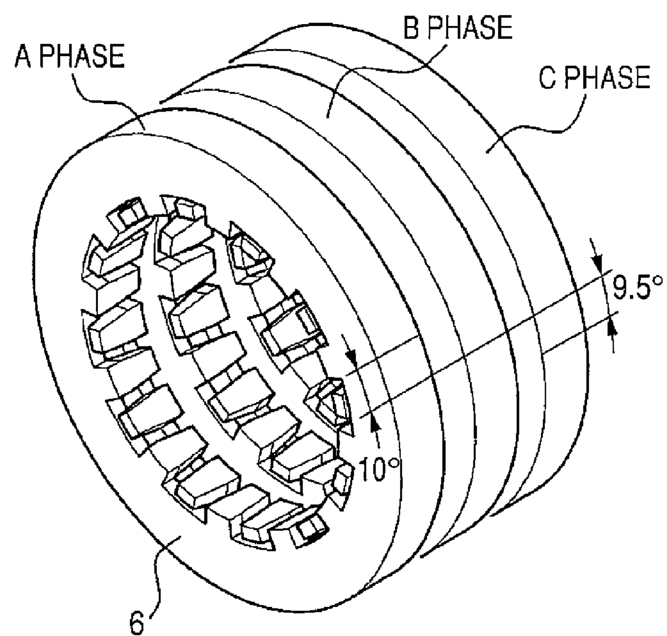
FIG. 11A is a perspective view for explaining a case where a rotational angle shift occurs between stators in the respective phases.
Figure 11B:
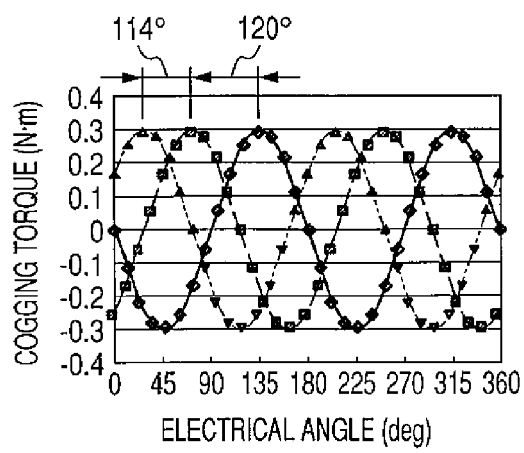
FIGS. 11B and 11C illustrate the results of cogging torque analyses.
Figure 11C:
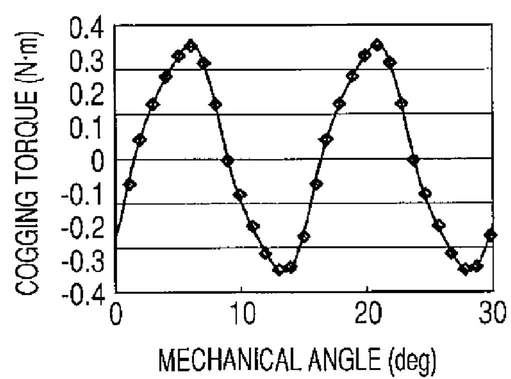

Description will be given to an embodiment in which cogging torque is reduced by providing stator cores 6 with a positioning mechanism to reduce a fabrication error. FIGS. 11B and 11C illustrate cogging torque produced when the position of a 24-pole motor is shifted with a positional error in the direction of rotation. In normal cases, one cycle of electrical angle corresponds to 30 degrees of mechanical angle. When the tolerance for fabrication is set to ±0.5 degrees or so, the amount of shift in electrical angle is ±6 degrees. FIGS. 11A to 11C illustrate an example where one phase is shifted by 0.5 degrees of mechanical angle due to a fabrication error. It will be assumed that the stators are assembled as illustrated in FIG. 11A. That is, the stator in phase A (u phase) is assembled as is shifted from the stator in phase B (v phase) by 10 degrees of mechanical angle. The stator in phase C (w phase), which should be shifted from the stator in phase B by 10 degrees, is assembled as is shifted by 9.5 degrees. At this time, the cogging torques in the individual phases are in the relation illustrated in FIG. 11B. That is, the torque in phase A and the torque in phase B are shifted from each other by 120 degrees of electrical angle, and the torque in phase B and the torque in phase C are shifted by 114 degrees. FIG. 11C illustrates the result obtained when the cogging torques in the three phases are combined. As is apparent from this result, the amplitude of the cogging torque is increased to 10 or more times the design value. (Refer to FIG. 8D.) Also, with respect to cycle, the cogging torque is of the secondary order for one cycle of electrical angle and this is of lower order than the sixth order which is the order of the original cogging torque of the three-phase motor. This causes low-frequency vibration and noise produced during rotation.

In order to reduce this cogging torque due to a fabrication error, the enhancement of assembly accuracy is indispensable. In this embodiment, consequently, the following molding structure is utilized to accomplish the enhancement of accuracy of an assembled motor. The above-mentioned problem relates to a positional error of multi-phase stators in the direction of rotation. Therefore, the invention is so structured that a resin portion is provided with a positioning function for positioning the position in the direction of rotation.

Figure 12A:
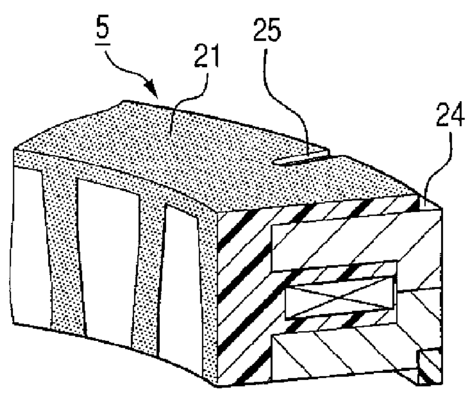
FIG. 12A is a perspective view of a stator provided with a spline-like projection for interphase positioning.
Figure 12B:
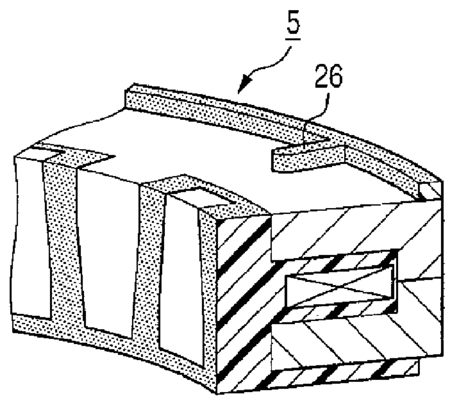
FIG. 12B is a perspective view of a stator provided with a spline recess for interphase positioning.

FIGS. 12A and 12B illustrate concrete examples of this structure. In the stator 5 in the FIG. 12A, the magnetic insulation material 21 constructed of a molded resin is provided with the following positioning function in addition to the above-mentioned socket and spigot joint section 24 for achieving coaxiality and parallelism. The magnetic insulation material 21 has an internal spline (keyway) 25 for positioning in the direction of rotation. That is, one of adjoining stators 5 is provided with an internal spline (keyway) 25, and the other is provided with an outer spline 26 like a projection (Refer to FIG. 12B.). When the inner spline 25 and the outer spline 26 are fit to each other, the relative angle between the adjoining stators 5 is uniquely determined, and the accuracy of positional relation after assembly is ensured. This makes is possible to obtain a motor with cogging torque reduced without fail.

According to this embodiment, as mentioned up to this point, the relative angle among the stator cores (6U, 6V, 6W) is uniquely determined by fitting together those splines (25, 26). In addition, coaxiality and parallelism can be achieved by the socket and spigot joint section 24. These enhance the assembly accuracy and reduce cogging torque.

Fourth Embodiment

Description will be given to an embodiment in which an air flow path (air duct) is formed in the magnetic insulation material 21 and a radiation fin and a turbine blade are provided to enhance radiation performance.

When a coil 13 is covered with the molded resin 20 (thermal conductivity is 0.6 W/m.K) as the potting compound, the thermal conductivity of a heat transfer path for transferring heat from the surface of the coil is increased as compared with cases where there is air around the coil 13 (The thermal conductivity of air is 0.1 W/m.K). However, the amount of this increase is not so large. In the case of having the magnetic insulation material 21, its heat conduction from the core in the axial direction is deteriorated as compared with cases where the magnetic insulation material 21 is not provided. Therefore, the radiation performance can be degraded. One of methods for significantly enhancing the thermal conductivity is increasing the thermal conductivity of resin itself. When resin kneaded with nonmagnetic material powder, such as silica and alumina, excellent in thermal conductivity is used as the potting material for thermosetting or thermoplastic resin, the thermal conductivity can be enhanced several-fold, for example, to 5.5 W/m.K.

Figure 13A:
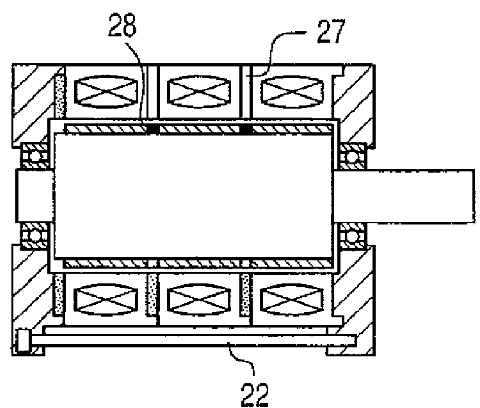
FIG. 13A is a structural drawing of a motor provided with an air flow path.
Figure 13B:
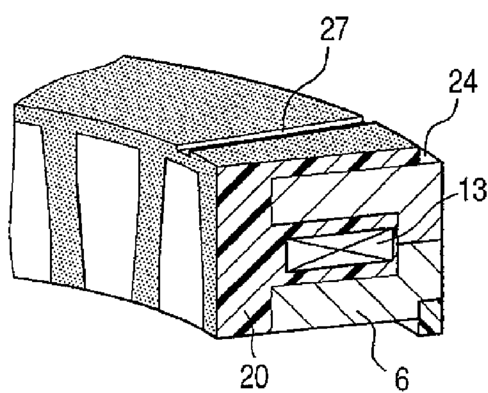
FIG. 13B is a perspective view of a stator provided with an air flow path.

In order to enhance the radiation performance, the structure illustrated in FIGS. 13A and 13B is adopted. An air flow path (air duct) 27 for air cooling is formed in the magnetic insulation material in the direction of the radius of the stator 5 so that it is extended from the inner radius portion to the outer radius portion. Then, wind is actively passed through this air duct. As illustrated in FIG. 13A, in addition, the magnetically insulated portion of the rotor magnet is provided with a turbine blade 28 or the like for agitating air in the air gaps in the rotary machine. Thus, wind flows from the interior out to the exterior, and flows in from the exterior. In the molded magnetically insulated portion of the stator 5, the air flow path 27 is formed by integral molding. Thus, the air agitated by the rotor flows through this path and cools it, and as a result, cooling capability is enhanced.

Figure 14A:
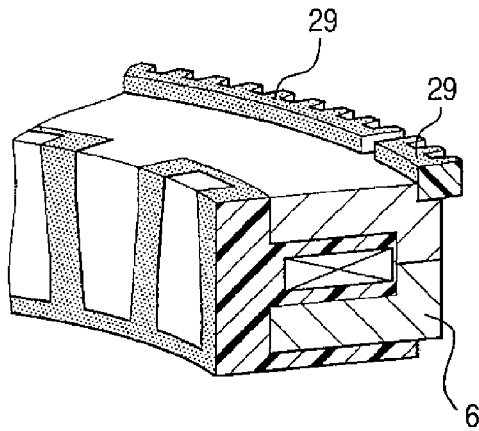
FIG. 14A is a perspective view of a stator provided with a radiation fin.
Figure 14B:
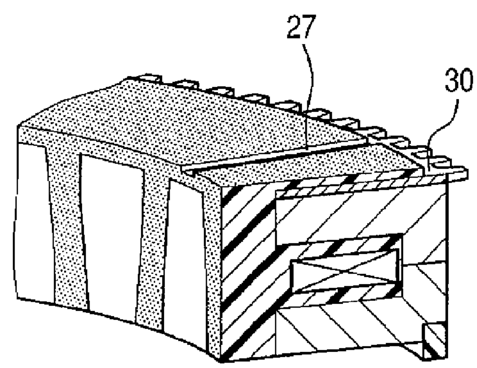
FIG. 14B is a perspective view of a stator provided with a metal radiator plate.

In addition, the measure illustrated in FIG. 14A may be taken. That is, the surface area of a vented portion, that is, a resin portion may be increased to form a radiation fin 29 for the further enhancement of cooling efficiency. Further, a motor excellent in radiation performance can be obtained by adopting insert molding as illustrated in FIG. 14B. That is, instead of using a material excellent in thermal conductivity, a metal radiator plate 30 of aluminum, copper, or the like excellent in thermal conductivity is set in a mold and it is simultaneously embedded the molded member such as the magnetic insulation material 21. Thus, the metal radiator plate 30 is placed between the magnetic insulation material 21 and a stator core (core block) 6. The metal radiator plate 30 is an annular thin plate and has recesses and projections (fins) formed in its peripheral portion.

Fifth Embodiment

Description will be given to insulation between the coil 13 and the stator core 6.

Figure 15:
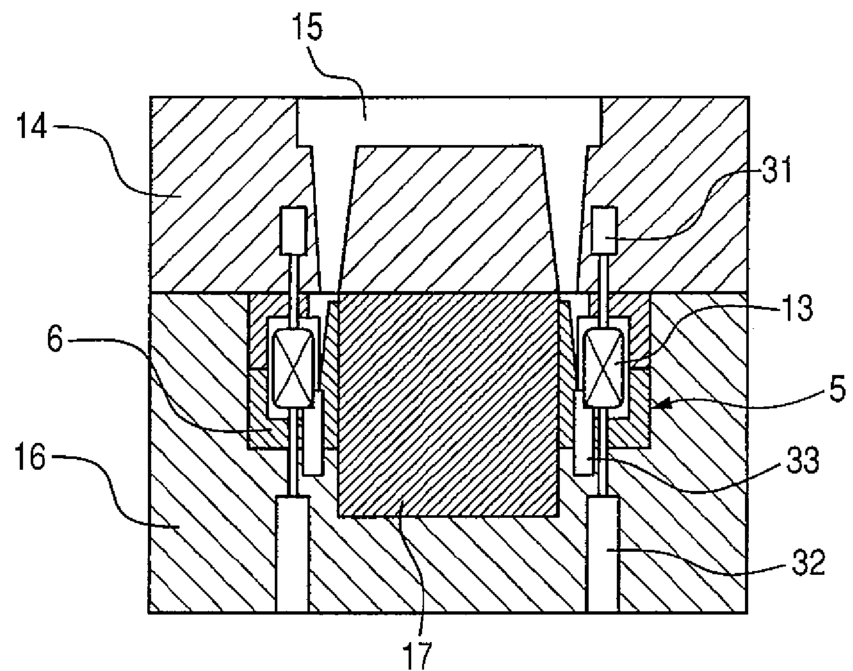
FIG. 15 is a structural drawing of a mold for molding a stator.

As illustrated in FIG. 4, the coil 13 of the claw teeth type motor in the above-mentioned embodiments is annular and very simple in structure. When this coil 13 is wound, consideration is given to insulation between it and the stator core 6. If the wound coil 13 is taped or treated by some other like method for insulation, this insulating treatment increases a number of man-hours and eventually the manufacturing cost of the motor though the winding is simple. The molding structure in this embodiment makes it possible to obtain the insulation of the coils 13 as well through integration by molding. FIG. 15 illustrates a concrete example of this method. The mold has therein coil positioning pins (upper coil retaining pins 31, lower coil retaining pins 32) as coil retaining jigs. A coil 13 and stator cores 6 are kept away from each other by these coil retaining pins during molding. Thus, a reliable motor can be manufactured without applying an insulating material to the wound coils 13. More specific description will be given. The manufacturing method for stators in this embodiment is for a stator 5 obtained by molding a coil 13 in a annular core with claws between an upper die 14 and a lower die 16. The annular core with claws is formed using two stator cores 6 each having an annular portion so formed that an edge of its sections is in an L shape and plural claw poles. These annular portions are abutted against each other, and the plural claw poles are engaged with each other. Thus, the coil 13 is wrapped with the two stator cores 6. The upper coil retaining pins 31 and the lower coil retaining pins 32 are inserted into through holes in the two stator cores 6. The stator cores 6 and the coil 13 are held by these pins with a distance provided between them. The two stator cores 6 and the coil 13 are molded in the mold using thermoplastic or thermosetting molding resin 20. The coil 13 can be positioned relative to the stator cores 6 in the direction of plane by providing the mold with a positioning block that can be inserted into a gap between the claw poles 6A, 6B. (Refer to FIG. 5.)

Sixth Embodiment

Description will be given to an embodiment in which the surfaces of the stator claw teeth cores 6 are coated to prevent oxidation (rusting) of the surfaces.

Figure 16A:
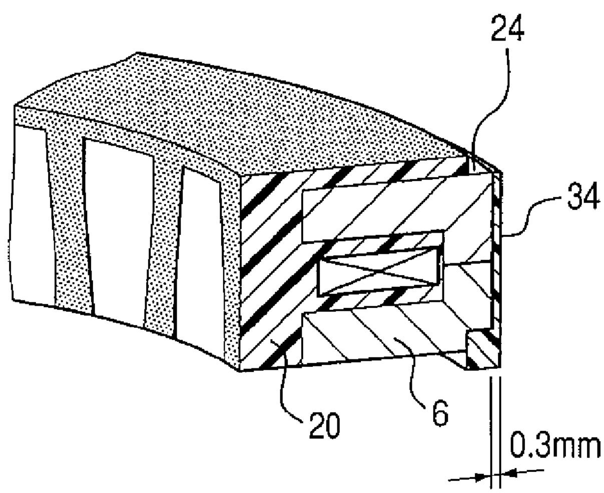
FIG. 16A is a perspective view of a stator subjected to rust prevention treatment.

Since the stator core 6 is a powder core, it has a portion obtained by compacting in its surface. For this reason, it has a disadvantage that, since powder arising from damaged insulating coating is scattered about, such points are very easily oxidized (rust very easily). For this reason, it is difficult to directly use a powder core for the surface of a motor, and it is required to treat the surfaces of the stator cores 6 by painting, plating, resin coating, or the like. The molding structure in this embodiment makes it possible to obtain this surface treatment by integral molding as the potting resin. In this case, the purpose can be achieved without significantly increasing the weight of the motor by providing so thin a motor surface resin film 34 as 0.3 mm or so from the surface of a powder core as illustrated in FIG. 16A. Since the thickness is not significantly increased, either, the motor can be further reduced in size.

Figure 16B:
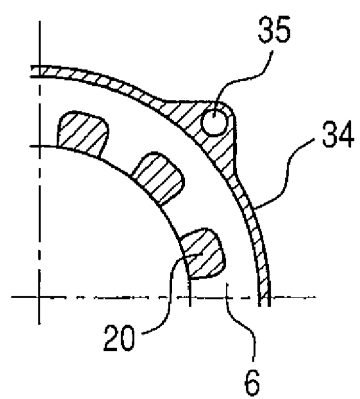
FIG. 16B is a structural drawing of a stator with a though bolt hole formed therein.

A through bolt 22 is required to fasten together the end brackets (bearing holding portions) at both ends of the electric rotary machine in the axial direction with the cores clamped in-between (Refer to FIG. 9B and FIG. 10A.). To prevent the through bolts 22 from being externally exposed for the prevention of the impairment of appearance, the though bolt holes 35 as resin shape can be formed in an integral molding structure (Refer to FIG. 16B.). Thus, the through bolts 22 are used to couple together the plural stators 5. The through bolts 22 may be constructed so as to fix the bearings 8A, 8B (Refer to FIG. 1.).

(Modifications)

The invention is not limited to the above-mentioned embodiments, and it can be variously modified, for example, as described below:

(1) In the description of the above embodiments, the invention is applied to a motor. Instead, it may be used for generators.

(2) In the above embodiments, a powder core is used for the stator cores 6. Also, when a metal plate of SPCC or the like is used, the mechanical strength is enhanced by resin molding.

(3) In the above embodiments, magnet torque is generated using the rotor magnet 4. Instead, the motor can be operated as a synchronous reluctance motor in which a rotor magnet 4 is not used at all. In this case, the rotor is formed substantially in the shape of a cylinder having recesses and projections in the circumferential direction in correspondence with the number of claw poles. The motor is so constructed that its reluctance is varied by rotation of this rotor.

What is claimed is:

1. A claw teeth type electric rotary machine comprising:

a stator including an annular core with claws formed from a powder core and an annular coil installed inside the annular core, and a rotor rotatably positioned inside the stator, wherein an inner edge of the annular core is provided with plural claw poles which are protruded at a predetermined interval in a circumferential direction and extended in an axial direction of the annular core so as to alternately meshes with each other, and wherein the stator comprises the annular core with claws, the annular coil, and a molded nonmagnetic potting material filled between the annular core with claws and annular coil, so that the annular core with claws and annular coil are integrated with the molded non-magnetic potting material, wherein the rotary machine is a three-phase electric rotary machine, wherein the annular cores with claws equivalent to three phases are layered in alignment, and adjoining annular cores with claws are shifted from each other by 120 degrees of electrical angle.

2. The claw teeth type electric rotary machine comprising:

a stator including an annular core with claws formed from a powder core and an annular coil installed inside the annular core, and a rotor rotatably positioned inside the stator, wherein an inner edge of the annular core is provided with plural claw poles which are protruded at a predetermined interval in a circumferential direction and extended in an axial direction of the annular core so as to alternately meshes with each other, and wherein the stator comprises the annular core with claws, the annular coil, and a molded nonmagnetic potting material filled between the annular core with claws and annular coil, so that the annular core with claws and annular coil are integrated with the molded non-magnetic potting material, wherein the potting material is a thermoplastic or thermosetting resin, and wherein on one or both end faces of the annular core with claws in the axial direction, magnetic insulation material of nonmagnetic material is integral-molded together with the resin.

3. The claw teeth type electric rotary machine according to claim 2, wherein a metal radiator plate is placed between the magnetic insulation material and a stator core.

4. The claw teeth type electric rotary machine according to claim 3, wherein the metal radiator plate has a peripheral portion thereof formed in a recessed and projected shape like fins.

5. The claw teeth type electric rotary machine according to claim 1, wherein each of the annular core with claws is provided with a recess and a projection as positioning for the annular core on one or both end faces thereof in the axial direction, and wherein the coaxiality of the annular cores with claws are ensured or the shift in the rotative direction of them is prevented by fitting together the recess and the projection.

6. The claw teeth type electric rotary machine according to claim 1, wherein the annular core with claws is provided on the outer circumferential surface thereof with an integral-molded resin film.

7. The claw teeth type electric rotary machine according to claim 1, wherein the resin is kneaded with nonmagnetic material powder so that the thermal conductivity is enhanced.

8. The claw teeth type electric rotary machine according to claim 7, wherein the nonmagnetic material powder is at least either of alumina and silica.

9. The claw teeth type electric rotary machine comprising:

a stator including an annular core with claws formed from a powder core and an annular coil installed inside the annular core, and a rotor rotatably positioned inside the stator, wherein an inner edge of the annular core is provided with plural claw poles which are protruded at a predetermined interval in a circumferential direction and extended in an axial direction of the annular core so as to alternately meshes with each other, and wherein the stator comprises the annular core with claws, the annular coil, and a molded nonmagnetic potting material filled between the annular core with claws and annular coil, so that the annular core with claws and annular coil are integrated with the molded non-magnetic potting material, wherein the annular core with claws is provided with an air duct extended from the air gap between the rotor and the stator to an outer peripheral portion of the stator.

10. The claw teeth type electric rotary machine according to claim 9, wherein the rotor is provided at a peripheral edge portion excluding a magnetic circuit with a blade for agitating air, and wherein the electric rotary machine is so structured that air is taken in and discharged through the air duct.

11. The claw teeth type electric rotary machine according to claim 1, wherein the annular coil and the annular core with claws are kept away from each other by the molded potting material.

12. The claw teeth type electric rotary machine according to claim 1, wherein each of the annular cores with claws has a resin on an outer surface thereof, and the resin has a though bolt hole formed therein, and wherein a through bolt coupling together the three annular cores with claws can be inserted into the hole.

13. The claw teeth type electric rotary machine according to claim 12, wherein the through bolt fixes a bearing for rotatably holding the rotor in the stators.

* * * * *